US012110256B2

United States Patent
Bouillon et al.

(10) Patent No.: US 12,110,256 B2
(45) Date of Patent: Oct. 8, 2024

(54) METHOD FOR MANUFACTURING A PART MADE FROM CMC (71) Applicant: SAFRAN CERAMICS, Le Haillan (FR)

(72) Inventors: Eric Bouillon, Le Haillan (FR); Eric Philippe, Merignac (FR); Gildas Garnier, Merignac (FR); Maxime François Roger Carlin, Merignac (FR); Michael Verrilli, Cincinnati, OH (US)

(73) Assignee: SAFRAN CERAMICS, Le Haillan (FR)

( * ) Notice: Subject to any disclaimer, the term of this patent is extended or adjusted under 35 U.S.C. 154(b) by 858 days.

(21) Appl. No.: 17/265,359

(22) PCT Filed: Jul. 23, 2019

(86) PCT No.: PCT/FR2019/051825
§ 371 (c)(1),
(2) Date: Feb. 2, 2021

(87) PCT Pub. No.: WO2020/025878
PCT Pub. Date: Feb. 6, 2020

(65) Prior Publication Data
US 2021/0292245 A1 Sep. 23, 2021

Related U.S. Application Data (60) Provisional application No. 62/714,263, filed on Aug. 3, 2018.

(51) Int. Cl.
*C04B 35/80* (2006.01)
*C04B 35/563* (2006.01)
(Continued)

(52) U.S. Cl.
CPC ............ *C04B 35/80* (2013.01); *C04B 35/563* (2013.01); *C04B 35/565* (2013.01);
(Continued)

(58) Field of Classification Search
CPC ...................................................... C04B 35/80
See application file for complete search history.

(56) References Cited

U.S. PATENT DOCUMENTS 4,889,686 A  12/1989  Singh et al.
4,994,904 A   2/1991  Nakagawa et al.
(Continued)

FOREIGN PATENT DOCUMENTS

CN   103998396 A   8/2014
EP   0 835 853 A1  4/1998
(Continued)

OTHER PUBLICATIONS

International Search Report as issued in International Patent Application No. PCT/FR2019/051825, dated Nov. 19, 2019.

*Primary Examiner* — Emmanuel S Luk
*Assistant Examiner* — Debjani Roy
(74) *Attorney, Agent, or Firm* — Pillsbury Winthrop Shaw Pittman LLP (57) ABSTRACT

A process for manufacturing a part made of composite material with a matrix at least predominantly made of ceramic includes producing a fibrous structure by three-dimensional or multilayer weaving; shaping the fibrous structure to form a fibrous preform core; depositing an interphase on the fibers of the preform core; consolidating the preform core by partial densification of the core including the formation of a matrix phase by chemical vapor infiltration or by a liquid process; depositing a powder of ceramic particles in the porosity of the preform core; draping one or more layers of pre-impregnated non-woven fibers
(Continued)

over all or part of the outer surface of the preform core; heat treatment of the preform core and of the pre-impregnated layer(s) to form a hybrid fibrous preform; further densifying by infiltration of the hybrid fibrous preform with an infiltration composition containing at least silicon to obtain a ceramic matrix composite part.

13 Claims, 5 Drawing Sheets

(51) Int. Cl.

| | |
|---|---|
| *C04B 35/565* | (2006.01) |
| *C04B 35/571* | (2006.01) |
| *C04B 35/58* | (2006.01) |
| *C04B 35/584* | (2006.01) |
| *C04B 35/628* | (2006.01) |
| *F01D 5/28* | (2006.01) |

(52) U.S. Cl.
CPC ...... *C04B 35/571* (2013.01); *C04B 35/58092* (2013.01); *C04B 35/584* (2013.01); *C04B 35/62863* (2013.01); *F01D 5/284* (2013.01); *C04B 2235/5244* (2013.01); *C04B 2235/5268* (2013.01); *C04B 2235/616* (2013.01); *F05D 2300/6033* (2013.01)

(56) References Cited

U.S. PATENT DOCUMENTS

| | | | |
|---|---|---|---|
| 5,015,540 A | 5/1991 | Borom et al. | |
| 5,246,736 A | 9/1993 | Goujard et al. | |
| 5,738,951 A | 4/1998 | Goujard et al. | |
| 5,965,266 A | 10/1999 | Goujard et al. | |
| 6,068,930 A | 5/2000 | Lamouroux et al. | |
| 6,284,358 B1 | 9/2001 | Parlier et al. | |
| 6,576,076 B1* | 6/2003 | Tani | C04B 35/573 |
| | | | 264/29.7 |
| 7,101,154 B2 | 9/2006 | Dambrine et al. | |
| 7,241,112 B2 | 7/2007 | Dambrine et al. | |
| 2003/0145934 A1* | 8/2003 | Tani | C04B 35/573 |
| | | | 156/89.11 |
| 2006/0043628 A1* | 3/2006 | Matsumoto | B32B 18/00 |
| | | | 264/137 |
| 2009/0169873 A1 | 7/2009 | Louchet-Pouillerie et al. | |
| 2010/0003504 A1 | 1/2010 | Louchet-Pouillerie et al. | |
| 2010/0111678 A1 | 5/2010 | Habarou et al. | |
| 2011/0293828 A1 | 12/2011 | Eberling-Fux et al. | |
| 2012/0055609 A1 | 3/2012 | Blanchard et al. | |
| 2015/0008613 A1* | 1/2015 | Bouillon | C04B 41/009 |
| | | | 264/232 |
| 2018/0135457 A1 | 5/2018 | Propheter-Hinckley | |

FOREIGN PATENT DOCUMENTS

| | | |
|---|---|---|
| FR | 2 790 470 A1 | 9/2000 |
| WO | WO 2010/061140 A1 | 6/2010 |
| WO | WO 2010/063946 A1 | 6/2010 |
| WO | WO 2010/072978 A1 | 7/2010 |

* cited by examiner

METHOD FOR MANUFACTURING A PART MADE FROM CMC

CROSS-REFERENCE TO RELATED APPLICATIONS

This application is the U.S. National Stage of PCT/FR2019/051825, filed Jul. 23, 2019, which in turn claims priority to U.S. patent application No. 62/714,263 filed Aug. 3, 2018. The content of these applications are incorporated herein by reference in their entireties.

BACKGROUND OF THE INVENTION

The invention relates to the manufacture of parts made of composite material with a matrix at least predominantly made of ceramic, a material hereinafter referred to as CMC.

In aircraft engines and in particular in gas turbines or turbomachines of such engines, parts subjected to high temperatures have long been made of metal alloys. Current and future requirements in terms of reducing specific consumption, decreasing pollution, etc., in aircraft engines generate a significant increase in mass for the latter.

In order to significantly reduce the mass and allow higher operating temperatures than those allowed with current metal alloys, ceramic matrix composites are increasingly being used.

Indeed, ceramic matrix composites (CMC) are part of the so-called thermostructural composite materials, i.e., composite materials with good mechanical properties and an ability to retain these properties at high temperature. Moreover, parts, such as blades, made of CMC have a significant mass gain compared with the same parts made with the customary metal alloys.

It is well known that CMC parts are formed by a fibrous reinforcement of refractory fibers (carbon or ceramic) obtained by three-dimensional or multilayer weaving which is densified by a ceramic matrix, in particular carbide, nitride, refractory oxide, etc. Typical examples of CMC materials are C—SiC materials (carbon fibrous reinforcement and silicon carbide matrix), SiC—SiC materials and C—C/SiC materials (mixed carbon/silicon carbide matrix). The manufacture of CMC parts is well known. Densification of the fibrous reinforcement with a ceramic matrix is in general carried out by a gaseous process (chemical vapor infiltration). A process for manufacturing a CMC turbomachine blade is in particular described in the document US2012055609.

However, the CMC parts thus obtained have an undulating and relatively rough surface appearance that may be incompatible with the aerodynamic performance required for parts such as blades. The surface undulation is due to the fibrous reinforcement while the roughness is related to the ceramic matrix, especially when it is deposited by chemical vapor infiltration (CVI). In addition, densification by CVI does not allow a very high densification rate to be achieved, the parts thus densified generally having a residual overall porosity comprised between 15% and 20% by volume.

OBJECT AND SUMMARY OF THE INVENTION

The object of the present invention is to manufacture CMC parts which have a controlled surface finish while retaining a structural character even on the surface.

To that end, the invention proposes a process for manufacturing a part made of composite material with a matrix at least predominantly made of ceramic, the process comprising:

the production of a fibrous structure by three-dimensional or multilayer weaving;
the shaping of the fibrous structure to form a fibrous preform core;
the deposition of an interphase on the fibers of the preform core;
the consolidation of the preform core by partial densification of said core comprising the formation of a matrix phase by chemical vapor infiltration;
the deposition of a powder of ceramic particles in the porosity of the preform core;
the draping of one or more layers of pre-impregnated non-woven fibers over all or part of the outer surface of the preform core;
the heat treatment of the preform core and of the pre-impregnated layer(s) in order to form a hybrid fibrous preform.
the further densification by infiltration of the hybrid fibrous preform with an infiltration composition containing at least silicon in order to obtain a ceramic matrix composite part.

By draping the outer surface of the 3D woven preform core with one or more non-woven layers, the final part is given a good surface finish compatible with aerodynamic applications while maintaining a structural character on the surface due to the presence of fibers in the layers. Moreover, three-dimensional or multilayer weaving makes it possible to define fibrous reinforcements having complex geometries and with very good mechanical resistance, in particular with regard to delamination, compared with reinforcements formed by stacking of two-dimensional layers of fabric. The 3D or multilayer woven preform core represents the bulk of the final volume of the part to be manufactured, the non-woven layer(s) being only draped on its surface to improve the surface finish of the core. The industrial benefit associated with the manufacture of composite material parts from a fibrous reinforcement obtained by three-dimensional or multilayer weaving is thus retained.

BRIEF DESCRIPTION OF THE DRAWINGS

Other features and advantages of the invention will emerge from reading the description made below by way of non-limiting indication with reference to the appended drawings on which.

DETAILED DESCRIPTION OF EMBODIMENTS

Figure 1:
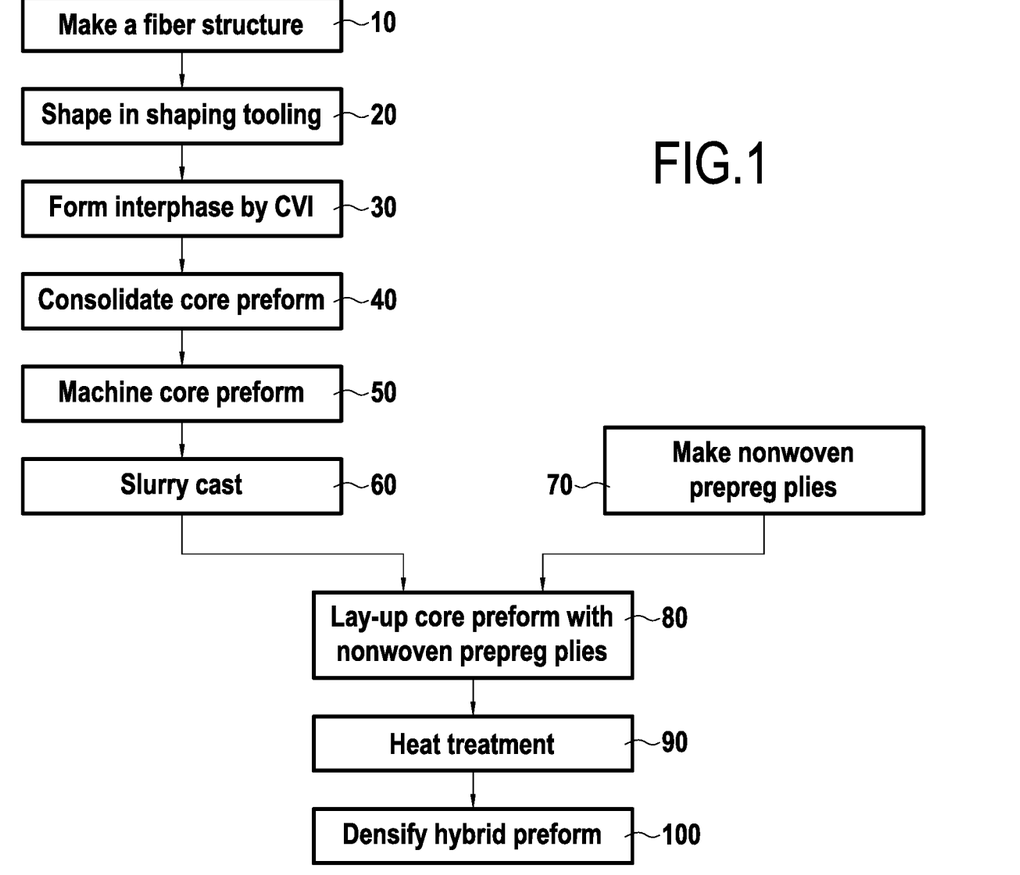
FIG. 1 is a flowchart indicating the successive steps of an embodiment of a process in accordance with the invention.

FIG. 1 shows the successive steps of an embodiment of a process according to the invention for the manufacture of a CMC part.

In step 10, a fibrous structure intended to form a fibrous preform core is obtained by three-dimensional weaving or by multilayer weaving.

As used herein, "three-dimensional weaving" or "3D weaving" means a weaving method in which at least some of the warp threads bind weft threads over several weft layers, for example an "interlock weave". As used herein, "interlock weave" means a 3D weave in which each warp layer interlinks several weft layers, with all the threads in the same warp column having the same movement in the weave plane.

As used herein, "multilayer weave" refers to a 3D weave with several weft layers whose basic weave of each layer is equivalent to a conventional 2D fabric weave, such as a canvas, satin or twill type weave, but with certain points of the weave that interlink the weft layers together.

The production of the fibrous structure by 3D or multilayer weaving makes it possible to obtain a bond between the layers, thus to have a good mechanical strength of the fibrous structure and of the composite material part obtained, in a single textile operation.

The fibrous structure can be produced in a known way by means of a jacquard type loom on which a bundle of warp threads or strands has been arranged in a plurality of layers, the warp threads being bound by layers of weft threads or strands also arranged in a plurality of layers. A detailed example of the production of a fibrous preform intended to form the fibrous reinforcement for an aircraft engine blade from a 3D woven fibrous preform is in particular described in detail in the documents U.S. Pat. Nos. 7,101,154, 7,241,112 and WO 2010/061140. The document US 2010/111678 discloses the production of a fibrous preform by three-dimensional weaving used to form a complete CMC ring intended for use in a gas turbine.

The threads or strands used to weave the core of the fibrous preform can be composed of ceramic fibers, for example fibers formed essentially of silicon carbide SiC (hereinafter referred to as SiC fibers) or silicon nitride $Si_3N_4$. In particular, threads supplied by the Japanese company Nippon Carbon under the name "Hi-Nicalon" or, preferably, under the name "Hi-Nicalon Type-S" having a high yield strength can be used. The threads or strands used can also be composed of carbon fibers.

In step 20, the fibrous structure is shaped and held in shape by means of a forming tool, to obtain a fibrous preform core having a shape close to that of the part to be manufactured. Examples of shaping of fibrous preforms from a fibrous structure can be found in particular in the patent application US 2011/0293828.

The preform core being held in its forming tool, for example made of graphite, an embrittlement-release interphase is formed in a known way by chemical vapor infiltration or CVI on the fibers of the preform core, this interphase being in particular made of pyrolytic carbon or PyC, or of boron nitride (BN), or of carbon, optionally boron-doped carbon or BC (with 5 at % to 20 at % boron, the remainder being carbon) (step 30). The thickness of the interphase is preferably comprised between 10 nm and 1000 nm.

The parameters of the CVI process, in particular temperature and pressure in the furnace, and composition of the reactive gas phase precursor of the interphase material, are chosen to have limited deposition kinetics in order to promote the diffusion of the gas phase into the preform core and to avoid a significant interphase deposition thickness gradient in the thickness of the preform. The deposition kinetics, for given parameters of the CVI process, can be easily determined experimentally, by measuring the thickness of a deposit formed on the surface of a control part, for example a monolithic SiC block, as a function of the duration of the deposition phase. It can also be measured by relating the thickness of the deposit, measured by optical or scanning electron microscopy examination on a polished cross-section, to the duration of the deposition phase.

In the case of ceramic fibers, in particular SiC fibers, a surface treatment of these fibers prior to the formation of the interphase coating may optionally be carried out to remove sizing and a surface layer of oxide such as silica $SiO_2$ if present on the fibers.

Moreover, after deposition of the interphase, in particular in the case of a BN interphase, a stabilizing heat treatment of the interphase can be carried out in a neutral atmosphere, for example under argon, without prior exposure of the interphase to an oxidizing environment and before formation of a matrix layer on the interphase. The heat treatment is advantageously carried out in the CVI furnace immediately after the interphase has been deposited. The object of the heat treatment is to chemically stabilize the interphase material by causing the outgassing of volatile species from the reactive gas phase present in the deposit, and by eliminating the presence of active sites on which oxygen could be grafted if the interphase were to be exposed to an oxidizing environment during the use of the CMC part.

In step 40, the preform core is consolidated by a matrix phase or layer deposited by a gaseous (CVI) or liquid process. In the case of the gaseous process, the preform core is held in the forming tool in the CVI furnace whereas a ceramic matrix layer is formed by CVI on the interphase for consolidation of the preform core, i.e., to bind the preform fibers together sufficiently so that the preform can retain its shape without the assistance of the forming tool. This matrix layer is for example made of SiC. The matrix layer can also be a layer of a self-healing material containing boron, for example a ternary Si—B—C system or boron carbide B4C capable of forming, in the presence of oxygen, a borosilicate type glass with self-healing properties. Reference can be made to the documents U.S. Pat. Nos. 5,246,736 and 5,965,266 which describe how such self-healing layers or phases are obtained by CVI.

Liquid consolidation consists in impregnating the preform core with a liquid ceramic precursor and performing a pyrolysis heat treatment to convert the precursor to ceramic. Liquid ceramic precursors, in particular SiC, can be polycarbosilane (PCS), polytitanocarbosilane (PTCS) or polysilazane (PSZ) type resins.

The thickness of the first matrix phase is at least equal to 500 nm, preferably comprised between 1 μm and 30 μm.

As indicated above, the total thickness of the interphase and the matrix layer is chosen to be sufficient to consolidate the fibrous preform core, i.e., to bind the fibers of the preform core together sufficiently so that the preform can be handled while retaining its shape without the assistance of holding tools. This thickness may be at least equal to 500 nm. After consolidation, the preform core remains porous, the initial porosity being for example only partially filled by the interphase and the matrix layer.

The production of PyC, BC, B4C, Si—B—C, $Si_3N_4$, BN and SiC deposits by CVI is known. Particular reference can be made to the documents U.S. Pat. Nos. 5,246,736, 5,738,951, 5,965,266, 6,068,930 and 6,284,358.

It should be noted that the step of forming the interphase by CVI can be carried out on the fibers of the fibrous structure prior to the forming of the fibrous structure as long as the interphase is thin enough not to affect the desired deformation capacity of the fibrous structure.

After consolidation, the porous consolidated preform core is removed from the forming tool. If necessary, the preform core can then be machined (step 50) to the desired shape and dimensions.

The following step (step 60) consists in impregnating the preform core with a slurry containing at least one powder of ceramic particles and one or more organic binders such as water by slurry casting (SC). The material of the particles can be chosen from one of the following materials or a mixture of the following materials: SiC, silicon nitride or $Si_3N_4$, SiC+C, boron carbide or $B_4C$ and titanium silicide or $TiSi_2$. Once the preform core has been impregnated, it is dried to remove the liquid phase (binders) from the slurry.

Figure 2:
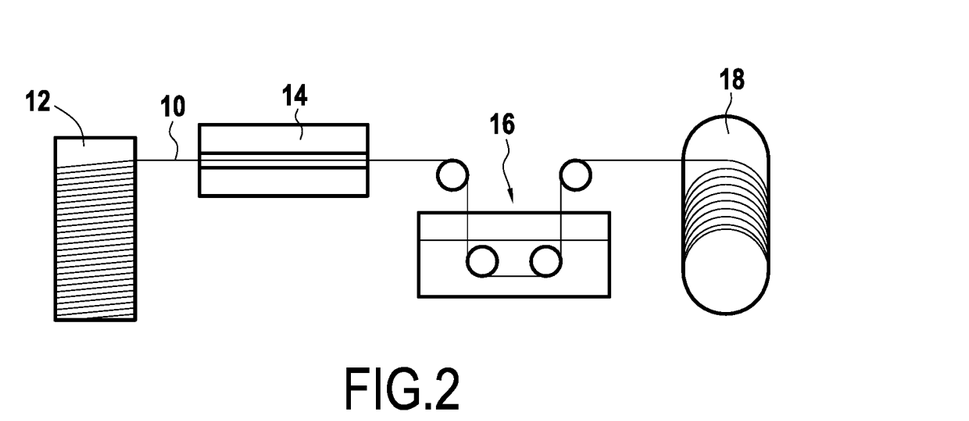
FIG. 2 shows the manufacture of unidirectional pre-impregnated layers or plies.

In parallel to steps 10 to 60 described above, the process includes the production of pre-impregnated non-woven layers or plies (step 70). More precisely, as shown in FIG. 2, a bundle of continuous fibers 10 is unwound from a reel or drum 12. The fibers are for example SiC or carbon fibers. The bundle 10 passes through a processing chamber 14 in which the continuous fibers are coated with a layer of a ceramic material, for example SiC, by chemical vapor deposition CVD. This ceramic coating serves to protect the fibers during subsequent processing. The ceramic coating can be made of SiC or of boron nitride (BN) alone or doped with silicon in order to increase the oxidation resistance. After the formation of the coating on the continuous fibers, the fiber bundle is passed through a container 16 which contains a carbon or ceramic precursor resin. By way of examples, liquid carbon precursors can be relatively high coke content resins, such as phenolic resins, whereas liquid ceramic precursors, such as SiC, can be polycarbosilane (PCS), polytitanocarbosilane (PTCS) or polysilazane (PSZ) type resins. The fiber bundle is then wound on a drum 18 to form a unidirectional pre-impregnated web. The web is then allowed to dry and removed from the drum. The web is cut into several parts to form unidirectional pre-impregnated layers or plies. Each layer is cut according to the shape and dimensions of the preform core part to be covered. Such a process for producing unidirectional pre-impregnated layers or plies is described in the document US 2006/0043628.

Pre-impregnated non-woven layers or plies can also be formed from discontinuous fibers bound together as a layer by a carbon or ceramic precursor resin.

The process continues by draping the preform core with one or more pre-impregnated non-woven layers obtained as described above (step 80). All or part of the outer surface of the preform core can be covered with the pre-impregnated non-woven layers. In case where only part of the outer surface of the preform core should have a smooth surface finish, as is the case for example for a part where only part of the outer surface is exposed to air flow, only this part is draped with the pre-impregnated non-woven layer(s). In the case for example of a composite material part which is intended to delimit part of the flow of a gas turbine, such as a turbine ring, only the outer surface of this part exposed to the flow needs to have a smooth surface finish and therefore to be draped with pre-impregnated non-woven layers.

Once the preform core is draped with the pre-impregnated non-woven layer(s), the assembly thus constituted is placed in a baking mold for heat treatment in step 90. In a known manner, the baking mold generally comprises two shells each with a respective impression, the impressions forming, once joined (i.e., after the mold is closed), a molding cavity corresponding to the shape and dimensions of the part to be manufactured. The mold is then heated, for example in an autoclave, to a temperature that allows the bonding of the pre-impregnated non-woven layers to the preform core and the conversion of the precursor present in the non-woven layers. The heat treatment carried out in step 90 includes a polymerization treatment which finalizes the bonding of the non-woven layers to the preform core and a pyrolysis treatment which converts the precursor present in the non-woven layers into carbon or ceramic. Pyrolysis allows the preparation of the pre-impregnated non-woven layers for the next infiltration step by re-opening the porosity in these layers, a shrinkage of 50% to 70% by volume of the precursor being observed after pyrolysis. A hybrid fibrous preform is then obtained consisting of the 3D woven preform core and the layer(s) bonded thereto.

In step 100, the densification of the hybrid fibrous preform is carried out by infiltration thereof with a silicon or silicon-based melt composition corresponding to the well-known melt infiltration (MI) process. More precisely, the hybrid preform is heated while being in contact with a source of molten metallic silicon or a silicon-containing melt alloy. The molten silicon easily wets the silicon carbide and/or carbon present in the preform, which greatly facilitates its penetration into the pores of the hybrid preform by capillary action. It is thus possible to obtain a high level of densification or, conversely, porosity rate.

In the case where the powder previously introduced into the preform core is carbon or if the hybrid preform contains an accessible carbon phase, and/or in the case of the presence of carbon residue in the hybrid preform, the silicon reacts with it to form silicon carbide SiC. In the case where the powder previously introduced into the preform core is made of ceramic, in particular carbide, nitride or silicide, a partially silicon matrix is obtained which binds the ceramic powder. In all cases, the matrix is predominantly made of ceramic.

An MI densification process is described in particular in the U.S. Pat. Nos. 4,889,686, 4,994,904 and 5,015,540. In this case, for the choice of the heat treatment temperature, it should more particularly be taken into account that the MI process with molten silicon infiltration is carried out at a temperature generally of at least 1420° C., although this temperature can be slightly lower with a silicon-based alloy.

The result is a ceramic matrix composite or CMC part that has a porosity of less than 10%, while having an outer surface that has in whole or in part a smooth surface finish.

The outer surface of the part or a part of this surface may be coated with a layer of ceramic "paint" or an environmental barrier coating (EBC) having a thermal and/or corrosion protection function in oxidizing and/or humid environments. Particular reference may be made to the patent applications WO2010/063946, WO 2010/072978, US 2009/0169873 and US 2010/003504.

An example of the implementation of a process of the invention applied to the manufacture of a CMC blade for a gas turbine such as that of an aircraft engine is now described.

Figure 3:
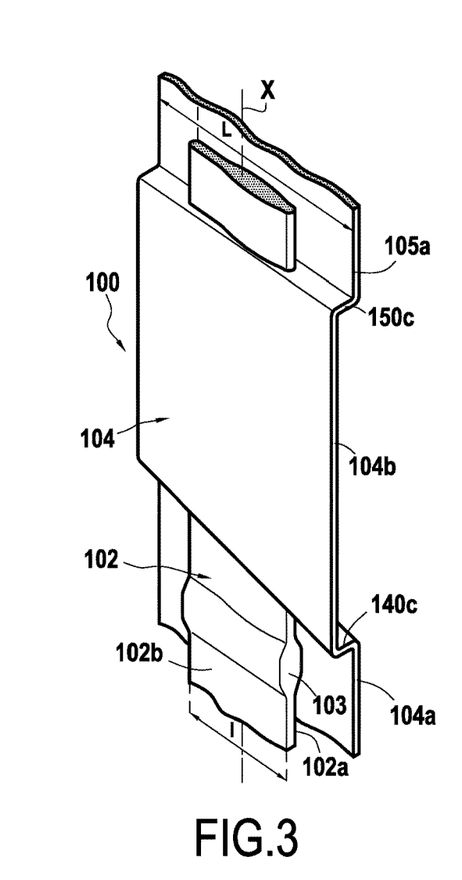
FIG. 3 shows in a highly schematic fashion the arrangement of two sets of layers of thread in a three-dimensional woven fibrous blank for the production of a fibrous preform for a blade.

FIG. 3 shows in a highly schematic fashion a fibrous blank 100 from which a blade fibrous preform core can be shaped, after densification by a matrix and possible machining. The blank 100, which comprises two parts 102, 104, is obtained by three-dimensional weaving or multilayer weaving (step 200, FIG. 9), only the shells of these two parts being shown in FIG. 3. The blank 100 is here woven with threads or strands consisting of SiC fibers and supplied by the Japanese company Nippon Carbon under the name "Hi-Nicalon Type-S".

The part 102 is intended, after shaping, to constitute a part of blade fibrous preform corresponding to a blade airfoil and root preform. The part 104 is intended, after shaping, to constitute the blade fibrous preform parts corresponding to blade platform and heel preforms. The two parts 102, 104 are in the form of webs extending generally in a direction X corresponding to the longitudinal direction of the blade to be produced. The fibrous web 102 has, in its part intended to form an airfoil preform, a variable thickness determined as a function of the profile thickness of the airfoil of the blade to be produced. In its part intended to form a root preform, the fibrous web 102 has an over-thickness 103 determined as a function of the thickness of the root of the blade to be produced.

The web 104 consists of a first part 104a which extends along and adjacent to a first side 102a of the web 102, a second part 104b which extends along and adjacent to the second side 102b of the web 102 and a third part 105a which extends along and adjacent to the first side 102a of the web 102. The parts 104a and 104b are connected by a connecting part 140c which extends transversely to the web 102 at a location corresponding to that of the blade platform to be made. The connecting part 140c crosses the web by forming an angle α with respect to the normal to the longitudinal direction of the fibrous blank. The parts 104b and 105a are connected by a connecting part 150c which extends transversely to the web 102 at a position corresponding to that of the blade heel to be produced.

The webs 102 and 104 are woven simultaneously by three-dimensional weaving, without bonding between the web 102 and the parts 104a, 104b and 105a of the web 104 and by weaving a plurality of successive blanks 100 continuously in the direction X.

Figure 4:
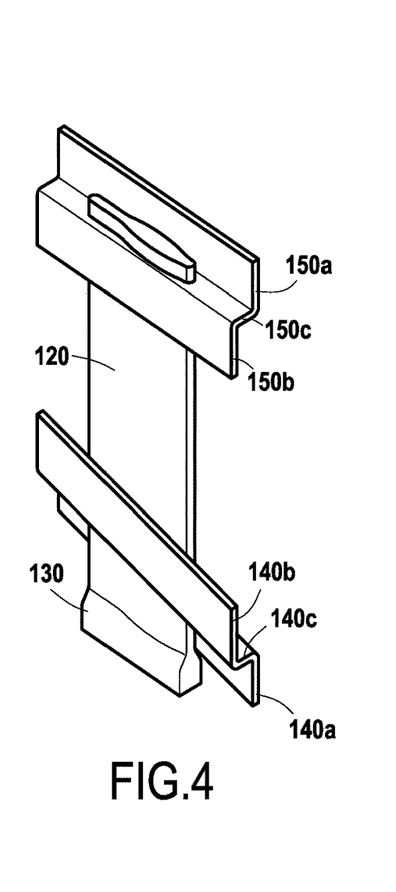
FIGS. 4, 5 and 6 show the successive steps of producing a fibrous preform core for a blade from the fibrous blank of FIG. 3.
Figure 5:
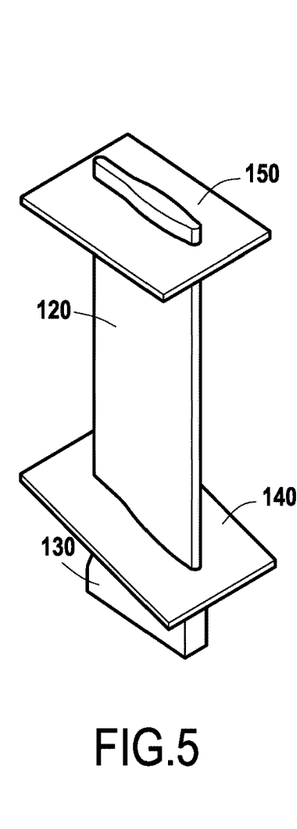
Figure 6:
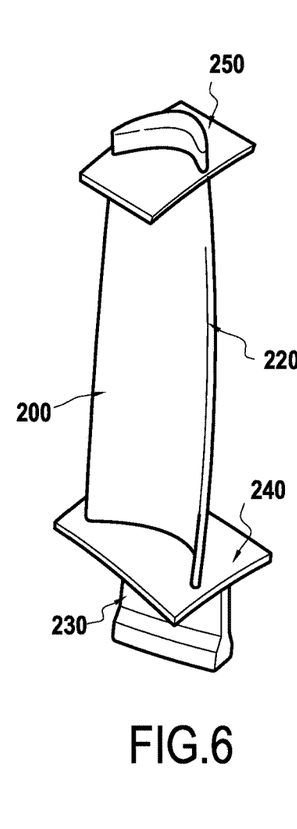

FIGS. 4 to 6 show in a highly schematic fashion how a fibrous preform having a shape close to that of the blade to be manufactured can be obtained from the fibrous blank 100.

The fibrous web 102 is cut at one end in the over-thickness 103 and at another end slightly beyond the connecting part 150c to have a web 120 of length corresponding to the longitudinal dimension of the blade to be manufactured with a swollen part 130 formed by a part of the over-thickness 103 and located at a position corresponding to the position of the root of the blade to be manufactured. In addition, cuts are made at the ends of the parts 104a, 105a of the web 104 and in the part 104b thereof to leave sections 140a and 140b on either side of the connecting part 140c, and sections 150a and 150b on either side of the connecting part 150c, as shown in FIG. 4. The lengths of the sections 140a, 140b and 150a, 150b are determined as a function of the platform and heel lengths in the blade to be manufactured.

Due to the unbonding between the fibrous blank web 102, on the one hand, and the parts 104a, 104b and 105a, on the other, the sections 140a, 140b, 150a and 150b can be folded over perpendicular to the web 102 without cutting any threads to form plates 140, 150, as shown in FIG. 5.

In step 210, a fibrous preform core 200 of the blade to be manufactured is obtained by molding with deformation of the web 102 to reproduce the curved profile of the blade airfoil and deformation of the plates 140, 150 to reproduce shapes similar to those of the blade platform and heel, as shown in FIG. 6. A fibrous preform core 200 is thus obtained with an airfoil preform part 220, a root preform part 230 (with stilt preform) and platform and heel preform parts 240, 250.

Figure 9:
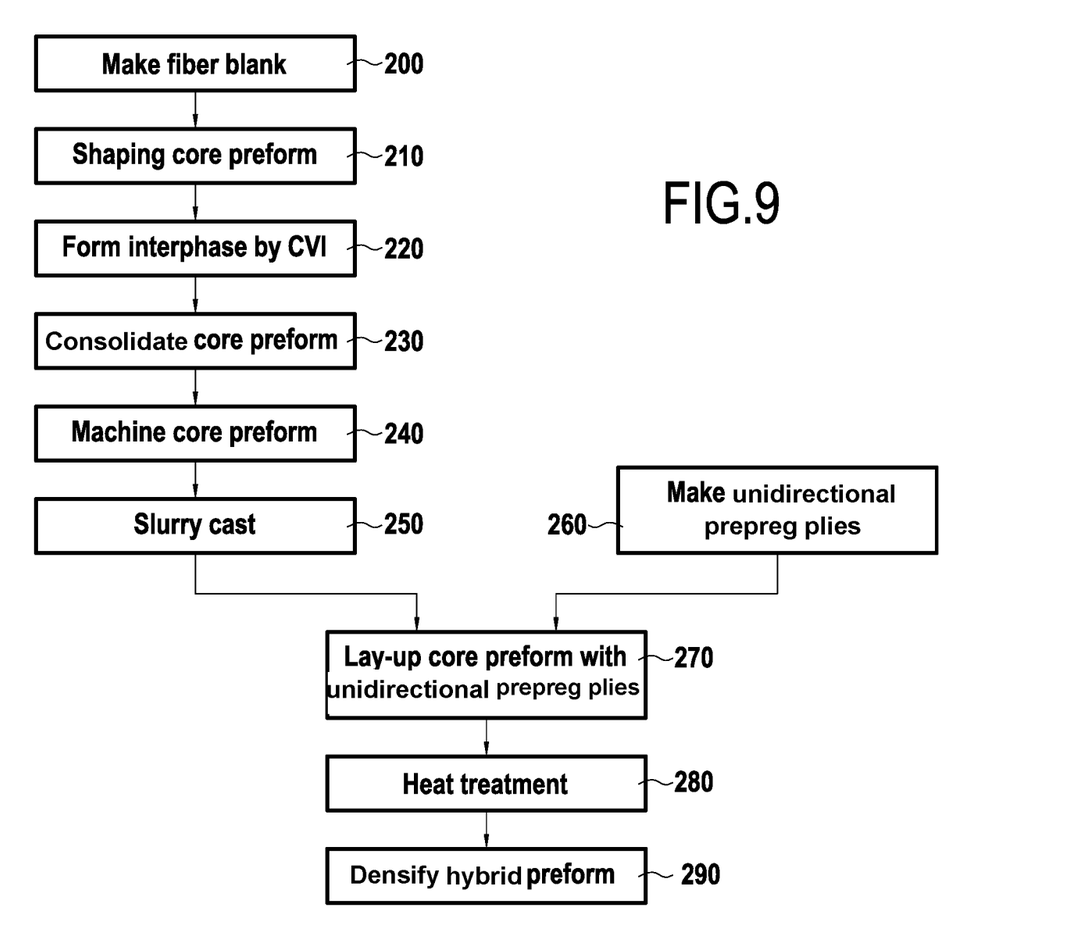
FIG. 9 is a flowchart showing the successive steps of a process in accordance with the invention applied to the manufacture of a gas turbine blade.

The preform core 200 being held in its forming tool, for example made of graphite, an interphase is formed by CVI on the fibers of the preform core, this interphase being here made of pyrolytic carbon or PyC or boron nitride (BN) (step 220).

In step 230, with the preform core still held in the forming tool in the CVI furnace, a layer of SiC matrix is formed by CVI on the interphase for consolidation of the preform core, i.e., to bind the preform fibers together sufficiently so that the preform can retain its shape without the assistance of the forming tool. After consolidation, the preform core remains porous, the initial porosity being for example only partially filled by the interphase and the matrix layer.

After consolidation, the porous consolidated preform core is removed from the forming tool. The preform core is then machined (step 240) to the desired shape and dimensions.

The next step (step 250) consists in impregnating the preform core with a slurry containing at least one powder of SiC or $Si_3N_4$ particles and one or more organic binders such as water by slurry casting (SC). Once the preform core is impregnated, it is dried to remove the liquid phase (binders) from the slurry.

Parallel to the steps 200 to 250 described above, pre-impregnated unidirectional layers or plies are made as described above (step 260). In the example described here, the layers are made from continuous SiC fibers coated by CVD with an interphase layer of boron nitride (BN) and SiC, the layers being pre-impregnated with an SiC precursor resin.

Figure 7:
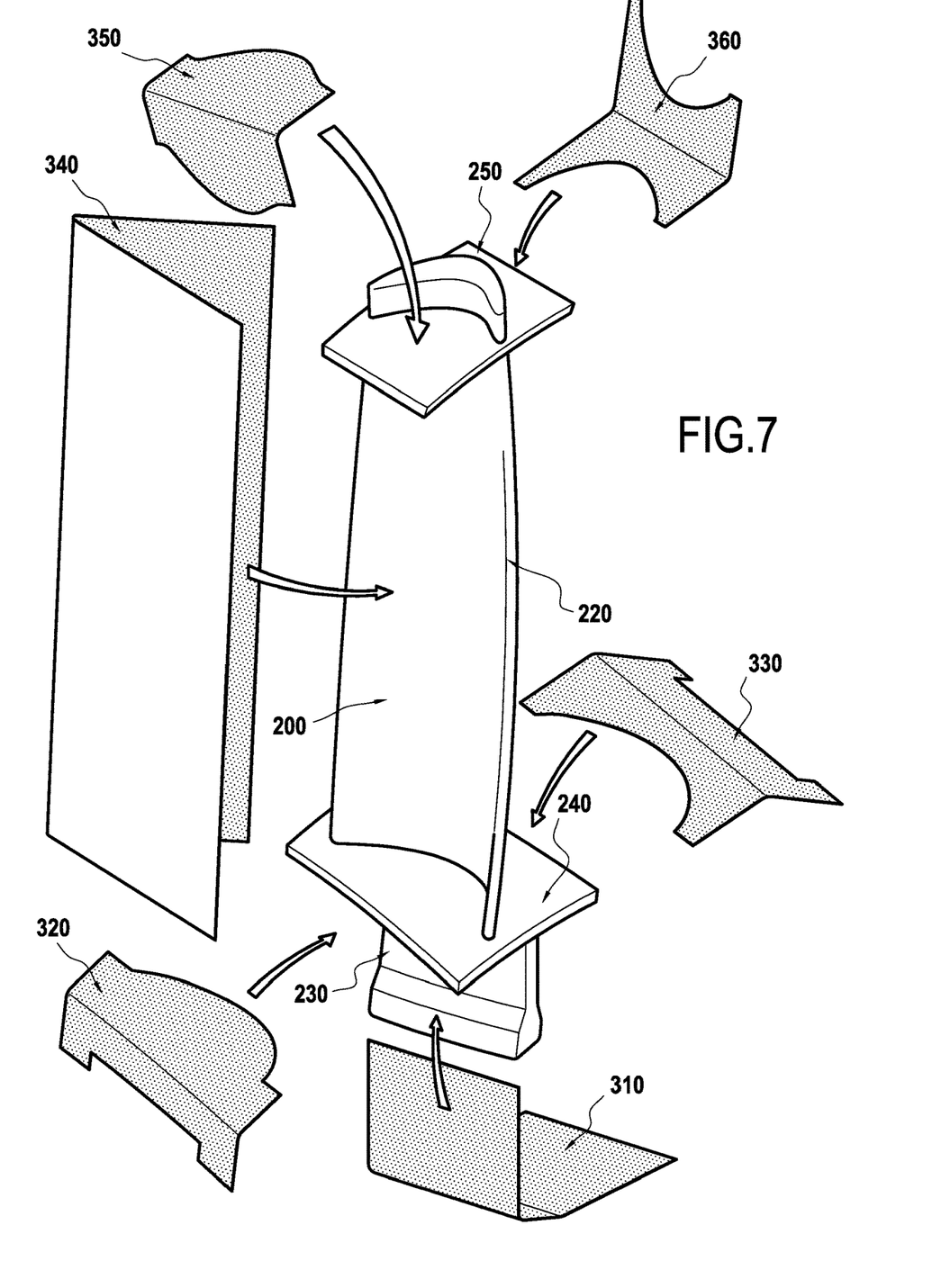
FIG. 7 shows the production of a hybrid fibrous preform from the preform core of FIG. 6.

In the example described here and as shown in FIG. 7, several layers 310, 320, 330, 340, 350 and 360 are cut. The layer 310 is intended to be draped over the part 230 of the root preform of the preform core. The layers 320 and 330 are intended to be draped over the platform preform part 240. The layer 340 is intended to be draped over the airfoil preform part 220. The layers 350 and 360 are intended to be draped over the heel preform part 250. As a function of the desired thickness, several copies of layers 310, 320, 330, 340, 350 and 360 can be draped over the corresponding preform core parts.

The production of the blade continues by draping the preform core with one or more unidirectional pre-impregnated layers obtained as described above (step 760, FIG. 7).

Once the preform core 200 has been draped by the layers 310, 320, 330, 340, 350 and 360, the assembly thus constituted is placed in a baking mold (step 280) in order to carry out a heat treatment in step 280. The heat treatment carried out in step 280 corresponds to polymerization and pyrolysis. A hybrid fibrous preform is thus obtained, consisting of the 3D woven preform core 200 and the layers 310, 320, 330, 340, 350 and 360 bonded thereto.

In step 290, densification of the hybrid fibrous preform is carried out by infiltration thereof with a silicon melt composition corresponding to the well-known melt infiltration (MI) process. The carbon residues present in the hybrid preform resulting in particular from pyrolysis react with the silicon to form SiC. The SiC or $Si_3N_4$ particles previously introduced into the preform core are bonded together by the silicon to form a matrix predominantly made of ceramic.

Figure 8:
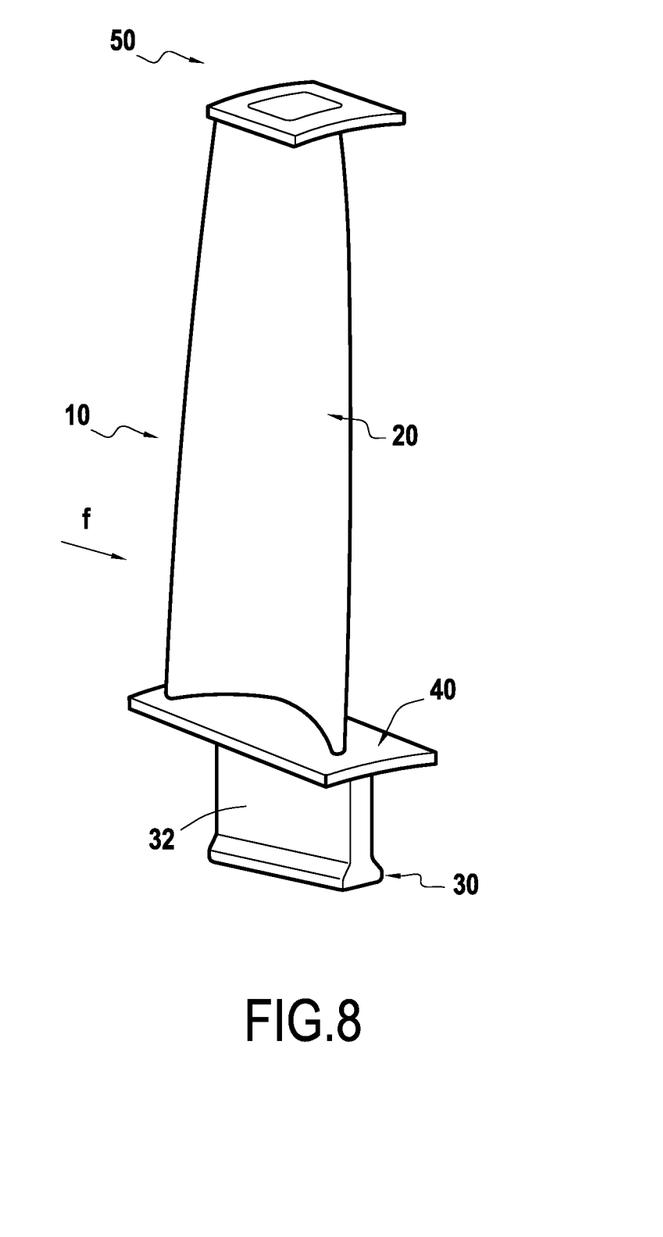
FIG. 8 is a perspective view of a gas turbine blade obtained from the hybrid preform of FIG. 9.

As shown in FIG. 8, a ceramic matrix composite or CMC blade 10 is thus obtained which has a porosity of less than 10% while having an outer surface which has in whole or part a smooth surface finish. The blade 10 comprises an airfoil 20, a root 30 formed by a portion of greater thickness, for example with a bulbous or dovetail-shaped cross-section, extended by a stilt 32, an inner platform 40 located between the stilt 32 and the airfoil 20, and an outer platform or heel 50 in the vicinity of the free end of the airfoil.

The outer surface of the blade can be coated with a layer of ceramic "paint" or an environmental barrier coating (EBC) having a thermal and/or corrosion protection function in oxidizing and/or humid environments.

The invention claimed is:

1. A process for manufacturing a part made of a composite material with a matrix at least predominantly made of ceramic, the process comprising:
producing a fibrous structure by three-dimensional or multilayer weaving;
shaping the fibrous structure to form a fibrous preform core;
depositing an interphase on the fibers of the preform core;
consolidating the preform core by partial densification of said core comprising the formation of a matrix phase by chemical vapor infiltration or by a liquid process;
depositing a powder of ceramic particles in a porosity of the preform core;
wherein, said process comprises, after the steps of producing, shaping, depositing, consolidating and depositing, the following steps:
draping one or more layers of pre-impregnated non-woven fibers over all or part of the outer surface of the preform core;
performing a heat treatment of the preform core and of the pre-impregnated layer(s) to form a hybrid fibrous preform;
further densifying by infiltration of the hybrid fibrous preform with an infiltration composition containing at least silicon in order to obtain a ceramic matrix composite part.

2. The process as claimed in claim 1, wherein the fibrous structure intended to form the preform core is woven with silicon carbide fiber threads or carbon fibers.

3. The process as claimed in claim 1, wherein the interphase consists of pyrolytic carbon or of boron nitride.

4. The process as claimed in claim 1, wherein, during consolidation, the matrix phase is formed in the preform core by chemical vapor infiltration, the matrix phase corresponding to a silicon carbide matrix or a self-healing matrix.

5. The process as claimed in claim 1, further comprising, after the consolidation of the preform core, machining the preform core.

6. The process as claimed in claim 1, wherein the ceramic material of the particles deposited in the porosity of the preform core is selected from one of the following materials or a mixture of the following materials: silicon carbide, silicon nitride, titanium silicide, boron carbide and carbon.

7. The process as claimed in claim 1, wherein the pre-impregnated non-woven layer(s) are formed from silicon carbide or carbon carbide fiber threads.

8. The process as claimed in claim 1, wherein the pre-impregnated non-woven layers are unidirectional layers of continuous fibers or layers of discontinuous fibers.

9. The process as claimed in claim 1, wherein the non-woven layers are pre-impregnated with a carbon or silicon carbide precursor resin, the heat treatment comprising a polymerization treatment of the resin and a pyrolysis treatment to convert the precursor to carbon or to silicon carbide.

10. A method comprising performing the process as claimed in claim 1 to the manufacture of a gas turbine blade, nozzle or combustor.

11. The process as claimed in claim 1, wherein the depositing the powder of ceramic particles in the porosity of the preform core comprises impregnating the preform core with a slurry containing at least one powder of ceramic particles.

12. The process as claimed in claim 1, wherein the slurry further comprises one or more organic binders.

13. A process for manufacturing a ceramic matrix composite part with a matrix at least predominantly made of ceramic, the process comprising, in order:
producing a fibrous structure by three-dimensional or multilayer weaving;
shaping the fibrous structure to form a fibrous preform core;
depositing an interphase on the fibers of the preform core;
consolidating the preform core by partial densification of said core comprising the formation of a matrix phase by chemical vapor infiltration or by a liquid process, such that the preform core remains porous and has a residual porosity;
depositing a powder of ceramic particles in the residual porosity of the preform core;
draping one or more layers of pre-impregnated non-woven fibers over at least part of an outer surface of the preform core;
performing a heat treatment of the preform core and of the one or more layers of pre-impregnated non-woven fibers to form a hybrid fibrous preform;
further densifying by infiltration of the hybrid fibrous preform with an infiltration composition containing at least silicon in order to obtain the ceramic matrix composite part.

* * * * *